Feb. 3, 1931.  G. C. CAPPA  1,790,640
DRIVING AXLE SUSPENSION FOR MOTOR CARS
Filed April 2, 1929  4 Sheets-Sheet 1
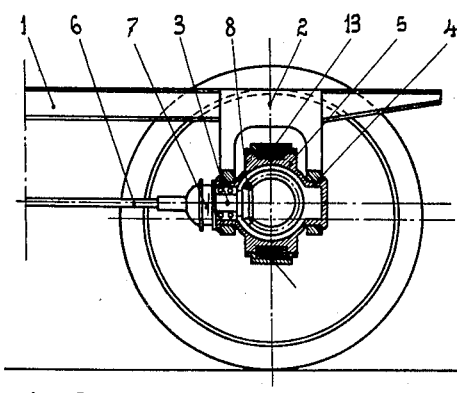
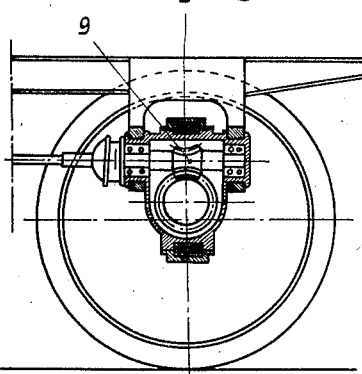
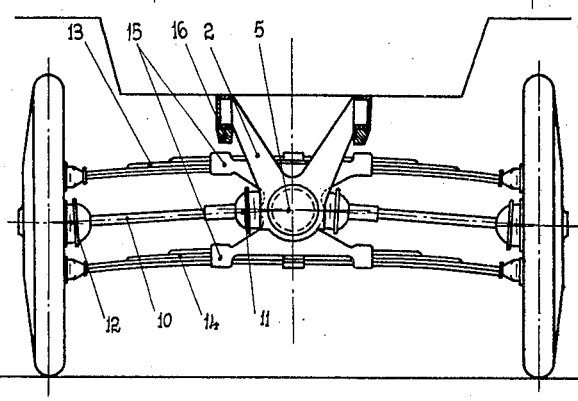
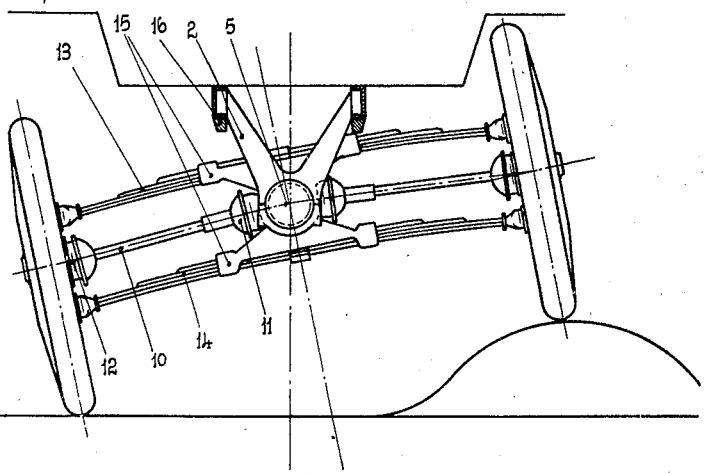

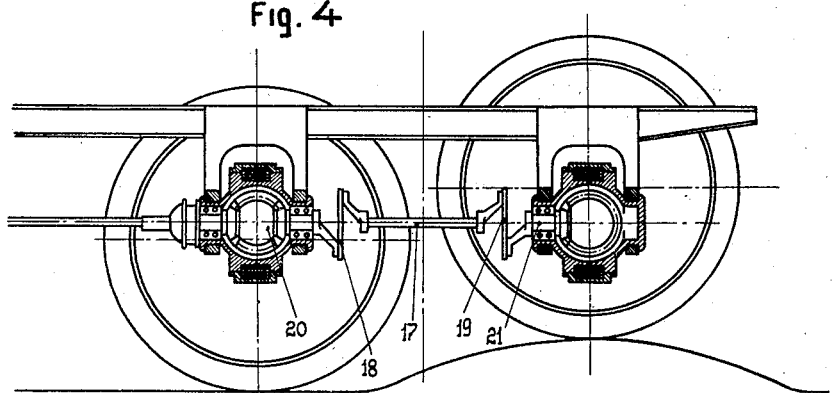
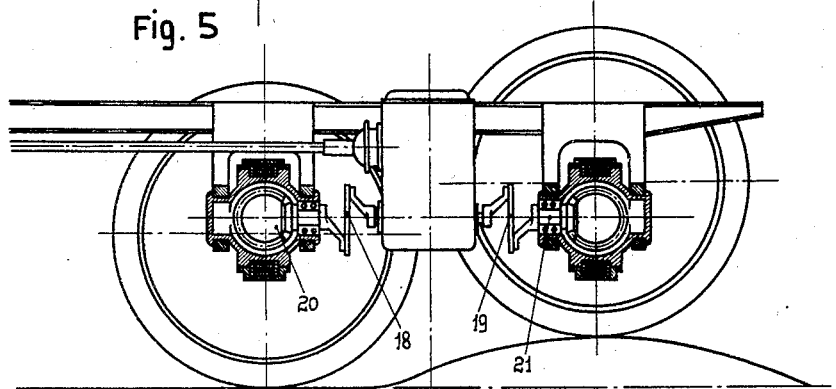
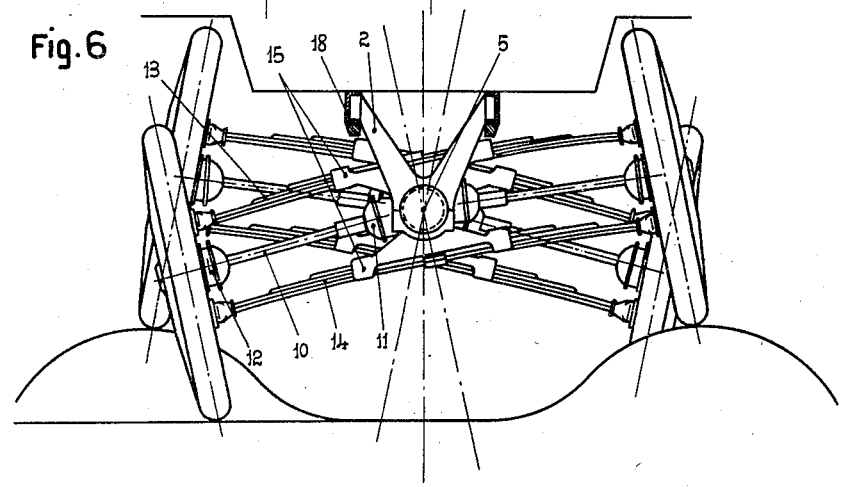

Feb. 3, 1931.    G. C. CAPPA    1,790,640
DRIVING AXLE SUSPENSION FOR MOTOR CARS
Filed April 2, 1929    4 Sheets-Sheet 3

Inventor
Giulio C. Cappa.
By
Atty.

Feb. 3, 1931.　　　　G. C. CAPPA　　　　1,790,640
DRIVING AXLE SUSPENSION FOR MOTOR CARS
Filed April 2, 1929　　　4 Sheets-Sheet 4

Inventor,
Giulio C. Cappa.
By
Atty.

Patented Feb. 3, 1931

1,790,640

UNITED STATES PATENT OFFICE

GIULIO CESARE CAPPA, OF TURIN, ITALY, ASSIGNOR TO SOCIETÁ ANONIMA AUTOMOBILE ANSALDO, OF TURIN, ITALY

DRIVING-AXLE SUSPENSION FOR MOTOR CARS

Application filed April 2, 1929, Serial No. 351,955, and in Italy April 5, 1928.

This invention has for its object an improved driving axle suspension for motorcars and is characterized by the fact that each axle unit can revolve transversely relative to the frame on an axis which lies substantially on the axis of the longitudinal power transmitting shaft. New particular advantages in the suspension and drive are thus obtained that will be hereafter set forth.

The annexed drawing shows by way of example some constructional forms of this invention.

Fig. 1a is a cross section of the axle according to a first constructional form.

Fig. 1b is a modified form thereof.

Figs. 2 and 3 are front views of the axle in two different positions.

Fig. 4 is an elevation view of a motorcar truck.

Fig. 5 is a modified form thereof.

Fig. 6 is a front view thereof.

Sheet 1

Figure 7:
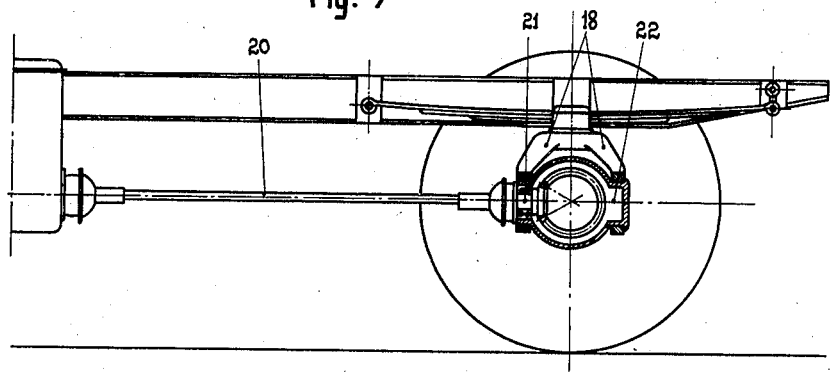
Fig. 7 shows a constructional form of the object of the invention applied to a vehicle provided with an ordinary suspension system.

Figs. 1a–3 show the simplest case of a single driving axle. A support 2 hangs from the frame side members 1 of a motorcar and carries the trunnions 3 and 4 on which the differential housing 5 rotates. The power transmitting shaft 6 through a suitable joint 7 enters the trunnion 3 and operates the differential by means of a bevel gear 8 (Fig. 1a) or a worm gear 9 (Fig. 1b) or any other suitable means. The motion is transferred from the differential to the driving wheels through the semi-shafts 10 and joints 11 and 12 respectively. The wheels are mounted by means of a pair of transverse springs 13 and 14 secured directly on the differential housing 5. This latter carries for this purpose four arms 15 provided with a deep groove and stops serving to guide the springs in their normal vertical action and limit their movement in either direction within the designed limits and to protect them from the abnormal cross sliding and twisting action. Finally said arms acting against the shock absorbing rubber pads 16 secured to the side members 1 limit the rotation of the truck in both directions.

Owing to this arrangement the drive and suspension members form a unit which revolves independently of the frame (Fig. 3). By the use of said unit that will be briefly designated hereafter as "truck" new advantages are obtained and advantages that until now could only be achieved by providing driving multiple coupled axles with complicated arrangements are extended to the case of a single driving axle. Thus for instance:

(a) The power transmitting shaft 6 and the truck trunnions 3 and 4 are arranged on the same axis in a constructively permanent position. They work therefore under conditions which are constant and independent of the truck rotation and spring deformation produced by uneven roads.

(b) Owing to the rotation of the truck on its trunnions 3 and 4, the wheels may be at a different height without requiring a spring deformation. Said springs act therefore chiefly to absorb vertical shocks (Fig. 3).

(c) The springs, being enclosed within the arms 15, as described, are guided and limited in their vertical motion in either direction and are protected against cross or twisting displacements due to countershocks caused by sudden braking, change of direction or speeding.

Sheet 2

Figs. 4, 5 and 6 show the more complex example of a double driving axle. This arrangement comprises two trucks like the one illustrated in Fig. 1a and placed at a suitable distance from one another. A power transmitting means from the first to the second truck is the only additional member, which, according to Fig. 4, is constituted by an intermediate shaft 17 connected at both ends by means of joints 18 and 19 to the bevel gears 20 and 21 which in the example shown are similar to the bevel gear 8 shown in Fig.

1a. However a worm gear as shown in Fig. 1b or the like may be used.

Great advantages are obtained by the arrangement of a double driving axle by means of two identical distinct and separate trucks, said advantages not being possible in the devices known heretofore requiring the coupling of two axles on a single truck. Said advantages are chiefly:

(d) Full independence of work of the trucks, so that the advantages mentioned under a, b, and c in connection with a single driving axle are maintained when two axles are coupled together, and moreover further advantages are obtained in the whole system. Thus for instance the alignment of the longitudinal power transmitting shafts and oscillating truck trunnions (see under (a)) eliminates the wide and variable angle of the Cardan joint occurring in the ordinary arrangements. Moreover, while in arrangements of this kind the freedom of the four driving wheels is limited by the necessity of connecting the wheels two by two on the same rocking lever, so that the displacement of a wheel relative to the other three brings about abnormal and complex twisting stresses in the suspension members, in the arrangement according to this invention the four driving wheels are perfectly free, each wheel being mounted independently of the other three, so that the displacement of one of the wheels does not affect the spring action of the others. Finally the particularly advantageous work conditions of the springs created by their particular attachment and integral rotation of the trucks (see under (b) and (c)) are ensured not only in the case of a level difference of the wheels in the transverse direction, but also in the longitudinal direction (Figs. 4 and 6).

(e) It is clear that by the described arrangement a considerable reduction in weight, size and number of parts and therefore a great economy in the construction and work are obtained. Moreover:

(f) It will be possible to transform easily a motor vehicle having a single driving axle into a double axle car by adding a second truck.

(g) It will be possible to apply if necessary a variable speed gear or a speed reducing gear between the two trucks of the double axle as clearly shown in Fig. 5.

*Sheet 3*

Figure 8:
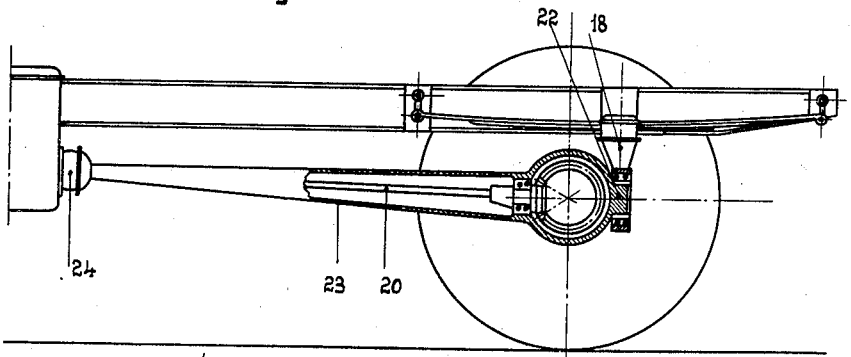
Fig. 8 is a modified form of Fig. 7.
Figure 9:
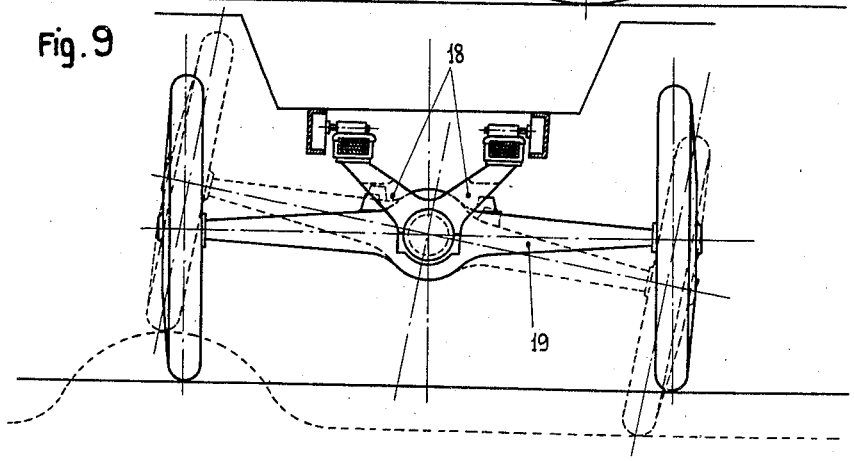
Fig. 9 is a front view thereof.

Figs. 7, 8 and 9 show the application of the principle of this invention to a motorcar having an ordinary suspension, namely springs which are connected to the frame instead of forming part of the revolving truck. Said figures show a longitudinal semi-elliptic spring suspension, but evidently the invention can be used also in connection with a single transverse semi-elliptic spring or cantilever springs or hydraulic cylinders with or without helical springs. It will in fact always be possible to connect to the suspension members a support 18 of the first considered type (2, Fig. 1a) on which the transverse rotation of the axle 19 may take place in the way and obtaining the advantages as set forth under (a) and (b). It will be seen that in the case of an axle having an uncovered transmission shaft 20 (Fig. 7) the support 18 will carry both oscillating trunnions 21 and 22; in the case of an axle having a transmission shaft 20 enclosed in a reaction tube 23 (Fig. 8), the support 18 will carry only the trunnion 22, as the trunnion 21 will coincide with the ball joint 24 of the reaction tube on the change speed gear box. Fig. 9 shows more clearly the advantages of this arrangement in both cases.

*Sheet 4*

Figs. 10, 11, 12, 13 and 14 show finally the principal examples of use of this invention on a motorcar of any type.

Figure 10:
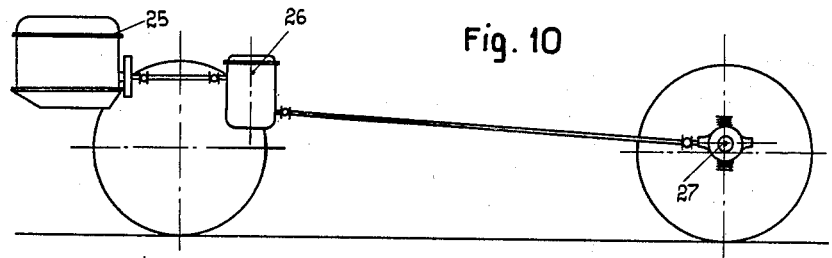
Figs. 10 to 14 show several arrangements in which the invention is used.

According to Fig. 10, the power is transmitted from the engine 25 to the change gear 26 and from this latter to a single rear driving axle 27 of the type shown in Fig. 1a.

Figure 11:
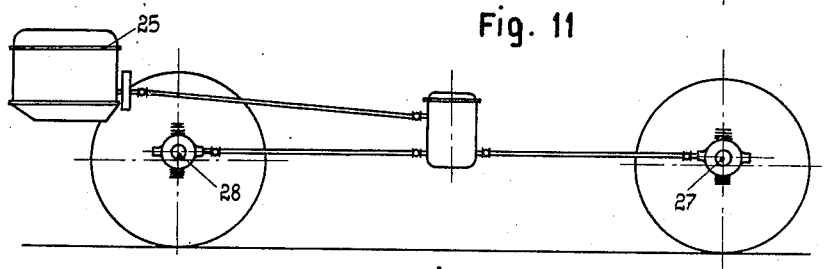

According to Fig. 11 the power is transferred from the change speed gear 26 independently to a rear driving axle 27 and a front driving axle 28, both of the type shown in Fig. 1a.

Figure 12:
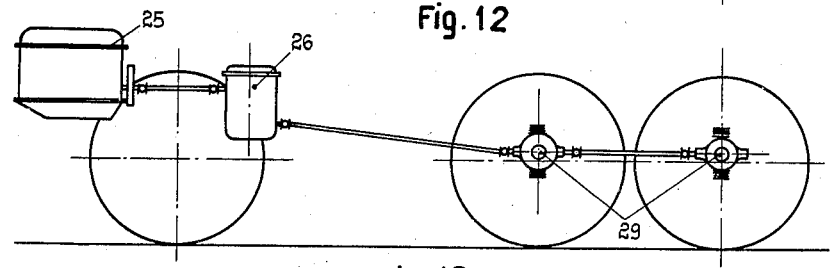

According to Fig. 12, the power is transmitted from the change speed gear 26 to a double rear driving axle of the type shown in Fig. 4.

Figure 13:
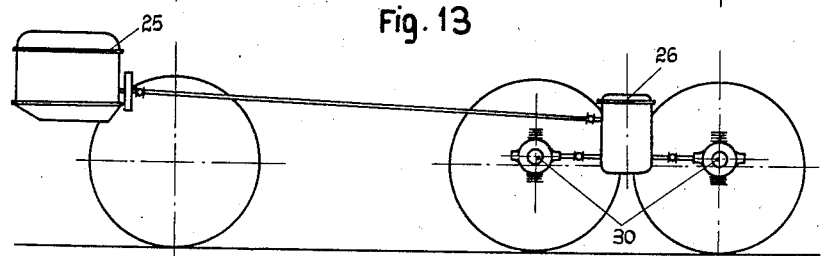

According to Fig. 13, the change speed gear 26 is arranged between two members of a double rear driving axle 30 of the type shown in Fig. 5.

Figure 14:
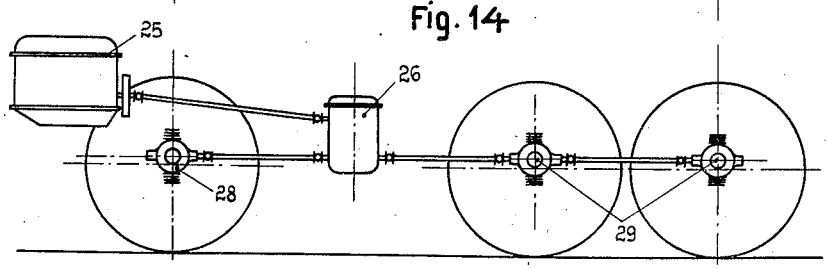

According to Fig. 14, the power is transferred from the change speed gear 26 independently to a front driving axle 28 of the type shown in Fig. 1a and to a double rear driving axle 29 of the type shown in Fig. 4.

Each of said arrangements confers to the motor car particular features that will be easily understood from the abovesaid. It will be seen that in the example shown in Fig. 11, both driving trucks will be prevented from rotation while in the example shown in Fig. 14 it will be necessary to lock the front driving truck. Different combinations may finally be obtained if, besides the variable speed gear box also a drive reducing gear is included in the system.

What I claim is:

1. Suspension device for motorcar driving axles comprising in combination with a frame, a driving axle and a shaft transmitting the power to said driving axle, a pair of transverse springs secured to the differential housing, arms integral with said housing and provided with a deep groove to guide the springs in their vertical movement, trunnions integral with the differential housing and lying substantially on the same axis as the transmission shaft and a support for said trunnions secured to the frame.

2. The combination with the frame of a motor vehicle, a rear axle, and a driving shaft operatively connected with the axle, of a hanger fixed to the frame above the axle, a differential housing for said axle having trunnions coaxial with the shaft journaled to oscillate in the housing, transverse springs fixed on the housing above and below the axle and movable with the housing independently of the frame, and laterally extending arms integral with the housing having grooves in their free ends to guide the springs in their vertical movement.

In testimony that I claim the foregoing as my invention, I have signed my name.

GIULIO CESARE CAPPA.